United States Patent [19]
Mogi et al.

[11] Patent Number: 5,657,123
[45] Date of Patent: Aug. 12, 1997

[54] FILM THICKNESS MEASURING APPARATUS, FILM THICKNESS MEASURING METHOD AND WAFER POLISHING SYSTEM MEASURING A FILM THICKNESS IN CONJUNCTION WITH A LIQUID TANK

[75] Inventors: Katsumi Mogi, Kitamoto; Osamu Endo, Omiya, both of Japan

[73] Assignee: Mitsubishi Materials Corp., Tokyo, Japan

[21] Appl. No.: 528,194

[22] Filed: Sep. 14, 1995

[30] Foreign Application Priority Data

Sep. 16, 1994 [JP] Japan .................................. 6-222265

[51] Int. Cl.$^6$ ................................................ G01B 9/02
[52] U.S. Cl. ................................................... 356/355
[58] Field of Search ................................. 356/355, 357; 437/7, 8; 359/509

[56] References Cited

U.S. PATENT DOCUMENTS 5,413,941  5/1995  Koos et al. .......................... 437/8
5,486,129  1/1996  Sandhu et al. ....................... 451/5
5,502,564  3/1996  Ledger ............................... 356/355

*Primary Examiner*—Samuel A. Turner
*Attorney, Agent, or Firm*—Armstrong, Westerman, Hattori, McLeland & Naughton

[57] ABSTRACT

A light interference-type film thickness measuring mechanism 24 measures a film thickness by irradiating a light emitted from a light transmission portion on to the bottom surface of a wafer W held by a wafer holding head 8 and receives the reflected light and. A cleaning mechanism 26 includes a cleaning fluid tank 27 a top surface of which is opened and arranged in the vicinity of the bottom surface of the wafer; a light transmission portion 50 formed at the bottom portion 48 of the tank 27; a wafer cleaning nozzle 40 spraying the cleaning fluid on the measuring points at the bottom surface of the wafer; a light transmission portion cleaning nozzle 44 spraying the cleaning fluid on the light transmission portion 50 and cleaning fluid supply means for supplying cleaning fluid to these nozzles.

10 Claims, 6 Drawing Sheets

FILM THICKNESS MEASURING APPARATUS, FILM THICKNESS MEASURING METHOD AND WAFER POLISHING SYSTEM MEASURING A FILM THICKNESS IN CONJUNCTION WITH A LIQUID TANK

BACKGROUND OF THE INVENTION

1. Field of the Invention

The present invention relates to a film thickness measuring device and to a measuring method for measuring a thickness of a film on a wafer, and further to a wafer polishing apparatus for polishing a film while measuring the thickness of a film on a wafer in-process.

2. Description of the Related Art

Recently, in manufacturing processes of semiconductor devices, a technique has been commonly used where aluminum or the like is evaporated onto a mirror finished surface of a wafer to form circuit patterns. An insulating film such as $SiO_2$ is formed thereon. Thereafter, the insulating film is flattened by polishing and further construction of the devices are sequentially structured thereon.

In polishing the film formed on the wafer as described above, it is very important to measure the thickness of the film precisely. As means for measuring the thickness, a light interference film thickness meter has been employed. The light interference film thickness meter, as is generally known, measures the thickness of the film by irradiating a light emitted from a light irradiation portion on the surface of the wafer, receiving the reflected light at the light irradiation portion and detecting interference of the reflected light at the top surface of the film and the reflected light at the bottom surface of the film. This film thickness meter, however, has a drawback because the thickness of the film cannot be measured unless the surface to be measured is cleaned.

Accordingly, it has been difficult to perform thickness measurement using the light interference film thickness meter during a wafer polishing step to control the amount of polishing. In addition, when using other indirect measuring methods where the film thickness can be measured regardless of the cleanliness of the wafer, a high accuracy required for the film polishing cannot be obtained.

The present invention has been made in consideration of the circumstances as described above, and has its object to provide a film thickness measuring apparatus, a film thickness measuring method and a wafer polishing system which can measure the thickness of the film with high accuracy during a polishing step of the wafer.

SUMMARY OF THE INVENTION

In order to attain the above object, a film thickness measuring apparatus may comprise a light interference-type film thickness measuring mechanism measuring a film thickness by irradiating a light emitted from a light irradiation portion on the surface of the film formed on the wafer through a light transmission portion, and receiving its reflected light at the light irradiation portion to detect interference thereof; a liquid charging tank having an opening at one end thereof and peripheral edge of the opening being arranged in close vicinity to the surface of the film formed on the wafer, and the light transmission portion of the light interference-type film thickness measuring mechanism being arranged opposite to film thickness measuring points of the wafer penetrating through a bottom portion of the other end thereof; and a liquid supply means for press-supplying the liquid capable of passing the light to the inside of the liquid charging tank.

Also, a further embodiment contemplates a film thickness measuring apparatus which may comprise a light interference-type film thickness measuring mechanism measuring a film thickness by irradiating a light emitted from a light irradiation portion on the surface of the film formed on the wafer, and receiving its reflected light at the light irradiation portion to detect interference thereof; and a cleaning mechanism mounted between the light transmission portion and the wafer film formation surface; the cleaning mechanism comprising a cleaning fluid tank having an opening at a surface opposite to the surface of the film formed on the wafer, and peripheral edge thereof being arranged in close vicinity to the surface of the film formed on the wafer, a light transmission portion formed at the bottom portion of the cleaning fluid tank allowing light transmission to the surface of the film formed on the wafer; a wafer cleaning nozzle provided on the cleaning fluid tank spraying the cleaning fluid on the measuring points of the surface of the film formed on the wafer; and a cleaning fluid supply means for supplying the cleaning fluid to the wafer cleaning nozzle.

Additionally, a film thickness measuring method may comprise the steps of preparing a liquid charging tank having an opening at one end thereof and a light transmission portion at the other end thereof; arranging the liquid charging tank so that the peripheral edge of the opening being in close vicinity to the surface of the film formed on the wafer to be measured for the thickness thereof; supplying a liquid capable of passing the light to the inside of the liquid charging tank so as to fill a space between the light transmission portion and the surface of the film formed on the wafer with the liquid; irradiating a light emitted from the light transmission portion of the light interference-type film thickness measuring mechanism on the surface of the film formed on the wafer through the light transmission portion and the liquid; receiving its reflected light at the light transmission portion; and detecting interference of the light so as to measure the thickness of the film on the wafer.

A further embodiment contemplates a film thickness measuring method the steps of arranging the cleaning fluid tank having an opening formed at one end thereof with the opening being opposite to the surface of the film formed on the wafer; supplying a cleaning fluid to the inside of the cleaning fluid tank to fill the tank with the cleaning fluid; overflowing the cleaning fluid from a gap between the opening and the surface of the film formed on the wafer; spraying the cleaning fluid from a wafer cleaning nozzle provided on the cleaning fluid tank on the measuring points of the surface of the film formed on the wafer to clean the measuring points; irradiating a light from the light transmission portion formed at the bottom portion of said cleaning fluid tank through only the cleaning fluid; and detecting interference of the reflected light at the top surface of the film formed on the wafer and the reflected light at the bottom surface of the film.

Furthermore, a further embodiment contemplates a wafer polishing system which may comprise a platen having a polishing pad affixed to the surface thereof rotated by a platen drive mechanism; wafer holding heads holding by suction one surface of the wafer to be polished to abut the other surface of the wafer against the polishing pad; a head drive mechanism polishing the other side of the wafer with the polishing pad by relatively moving the wafer holding heads parallel to the platen; and a film thickness measuring apparatus for measuring the thickness of the film formed on the surface of the wafer polished; the film thickness measuring device comprising a light interference-type film thickness measuring mechanism measuring a film thickness by irradiating a light emitted from a light irradiation portion on the surface of the wafer polished, and receiving its reflected light at the light irradiation portion to detect interference thereof; a cleaning mechanism mounted between the light transmission portion and the surface of the wafer polished; and an advance/retreat mechanism for moving the light interference type film thickness measuring mechanism and the cleaning mechanism between a position removed from the wafer and a position where said cleaning fluid tank is arranged in the vicinity of the surface of the wafer polished; the cleaning mechanism including a cleaning fluid tank having an opening opposing to the surface of the polished wafer and peripheral edges thereof being arranged in the vicinity of the surface of the wafer polished; a light transmission portion formed at the bottom of the cleaning fluid tank allowing light transmission between the light transmitting portion and the surface of the wafer polished; a wafer cleaning nozzle provided on the cleaning fluid tank spraying the cleaning fluid on the measuring points of the surface of the wafer polished; and a supply means for supplying the cleaning fluid to the wafer cleaning nozzle.

The thickness of a film formed on a wafer is measured by arranging a liquid charging tank so that the peripheral edge of a liquid charging tank is in the close vicinity to the surface of the film formed on the wafer. The liquid is supplied to the inside of the liquid charging tank so as to fill a space between the light transmission portion and the surface of the film formed on the wafer with the liquid. A light emitted from the light transmission portion of the light interference-type film thickness measuring mechanism is irradiated on to the surface of the film formed on the wafer through the light transmission portion and the liquid. The light transmission portion receives reflected light and detects interference of the light. By this, the thickness of the film can be measured with high accuracy while filling the space between the light transmission portion and the surface of the film formed on the wafer with the liquid to remove vapor and preventing disturbances due to vapor to light interference measuring. Furthermore, since there is no deterioration of the wafer due to drying, working of the wafer after the film thickness measurement can be started immediately thereafter.

The thickness of the film can be measured by supplying the cleaning fluid to the cleaning fluid tank arranged opposite to the surface of the film formed on the wafer. The cleaning fluid flows out from the cleaning fluid tank from a gap between the peripheral edge of the opening of the cleaning fluid tank and the surface of the film formed on the wafer to remove vapor. Light is irradiated on to the surface of the film formed on the wafer through the light transmission portion of the cleaning fluid tank and the cleaning fluid in the tank while spraying the cleaning fluid on the film thickness measuring points of the wafer. Therefore, even if a film thickness of a contaminated wafer is measured during a working, such as polishing, the thickness can be measured with the high accuracy of the light interference film thickness measuring method while removing any contamination of the surface of the film formed on the wafer with cleaning fluid and while preventing sticking of any contamination on the wafer due to drying. In addition, by filling a space between the light transmission portion and the surface of the film formed on the wafer with the cleaning fluid to remove vapor, disturbances to light interference due to the vapor can be prevented and the thickness can be correctly measured. Further, since there is no deterioration of the wafer due to drying, working of the wafer after the film thickness measurement can immediately be started thereafter. Therefore, the thickness of the film can be measured with high accuracy during a working step, and the results thereof can be easily reflected to the working. When measuring during polishing, the amount of polishing can be corrected based on the measurement results, thereby easily performing high-accuracy polishing.

Figure 1:
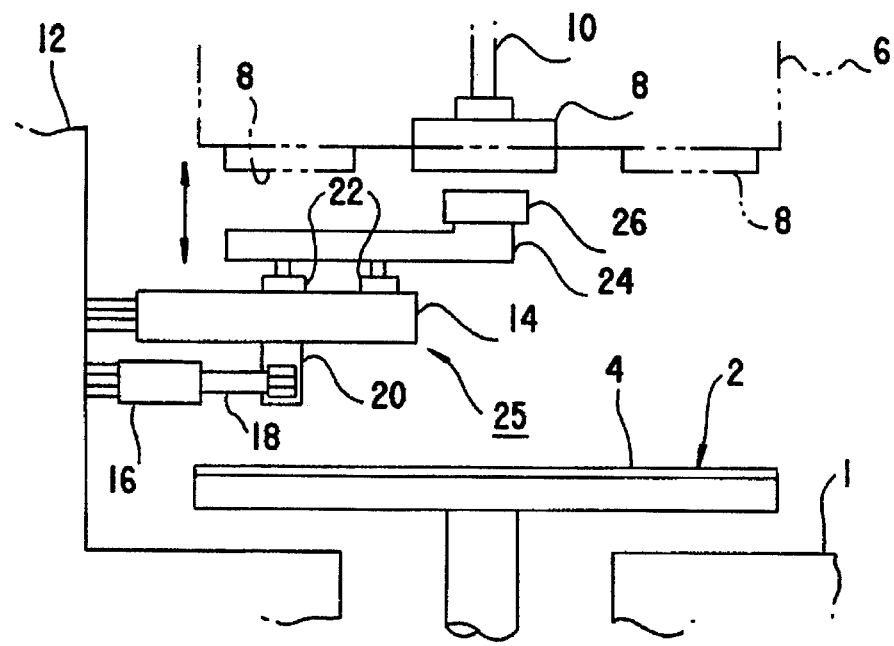
FIG. 1 is a side view showing an embodiment of a wafer polishing system according to the present invention.

Reference Numerals
1 base
2 platen
4 polishing pad
6 head drive mechanism
8 film holding head
14 rotation arm
16 rotation cylinder (advance/retreat mechanism)
22 ascent/descent cylinder
24 light interference-type film thickness measuring mechanism
25 wafer thickness measuring apparatus
26 cleaning mechanism
27 cleaning fluid tank
28 CCD camera
30 Wollaston prism
34 objective lens
36 mirror
40 wafer cleaning nozzle
42 laser light source
43 light source cable
44 light transmission portion cleaning nozzle
46 groove
48 bottom portion
50 light transmission portion
52 bottom deep portion
54 cleaning fluid discharge passage
O center point of wafer
C chip
S film thickness measuring range

DETAILED DESCRIPTION

FIG. 1 is a front view of a wafer polishing system incorporating a film thickness measuring apparatus according to the present invention. In the drawing, there is provided a base 1 of the polishing system on which a disc-like platen 2 is mounted in a horizontal position so as to be rotated by a platen drive mechanism (not shown) provided therein. A polishing pad 4 for polishing the wafer is affixed to the top surface of the platen 2.

Figure 2:
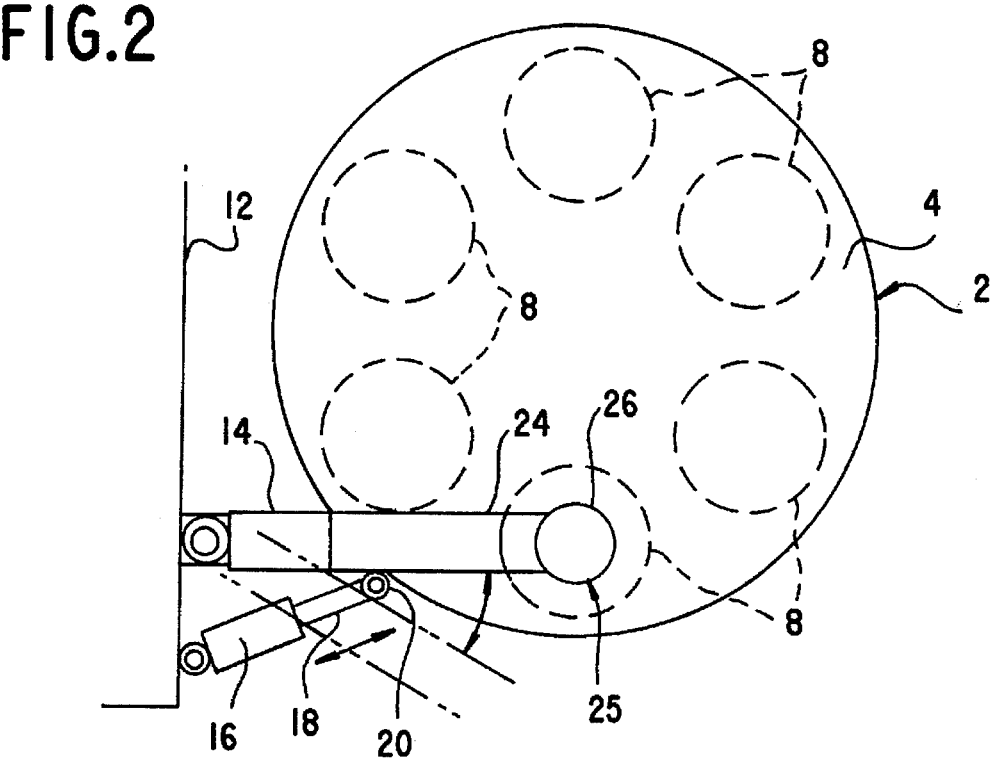
FIG. 2 is a plan view of the wafer polishing system shown in FIG. 1.
Figure 3:
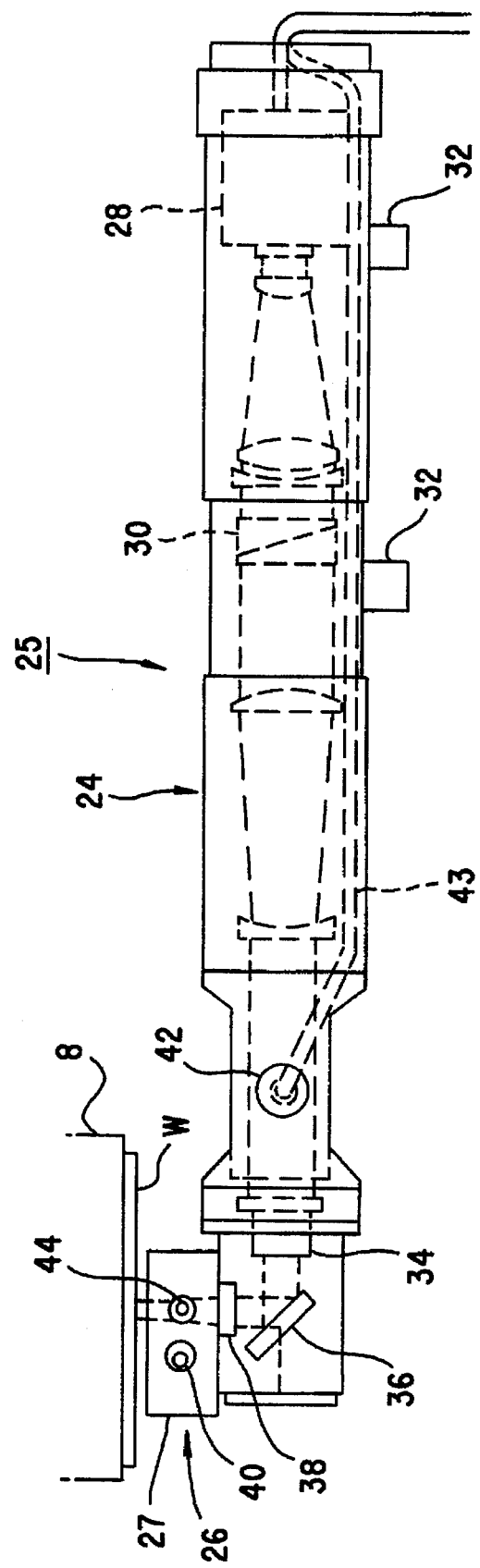
FIG. 3 is a side view of a light interference-type film thickness measuring mechanism 24 included in the wafer polishing mechanism shown in FIGS. 1 and 2.
Figure 4:
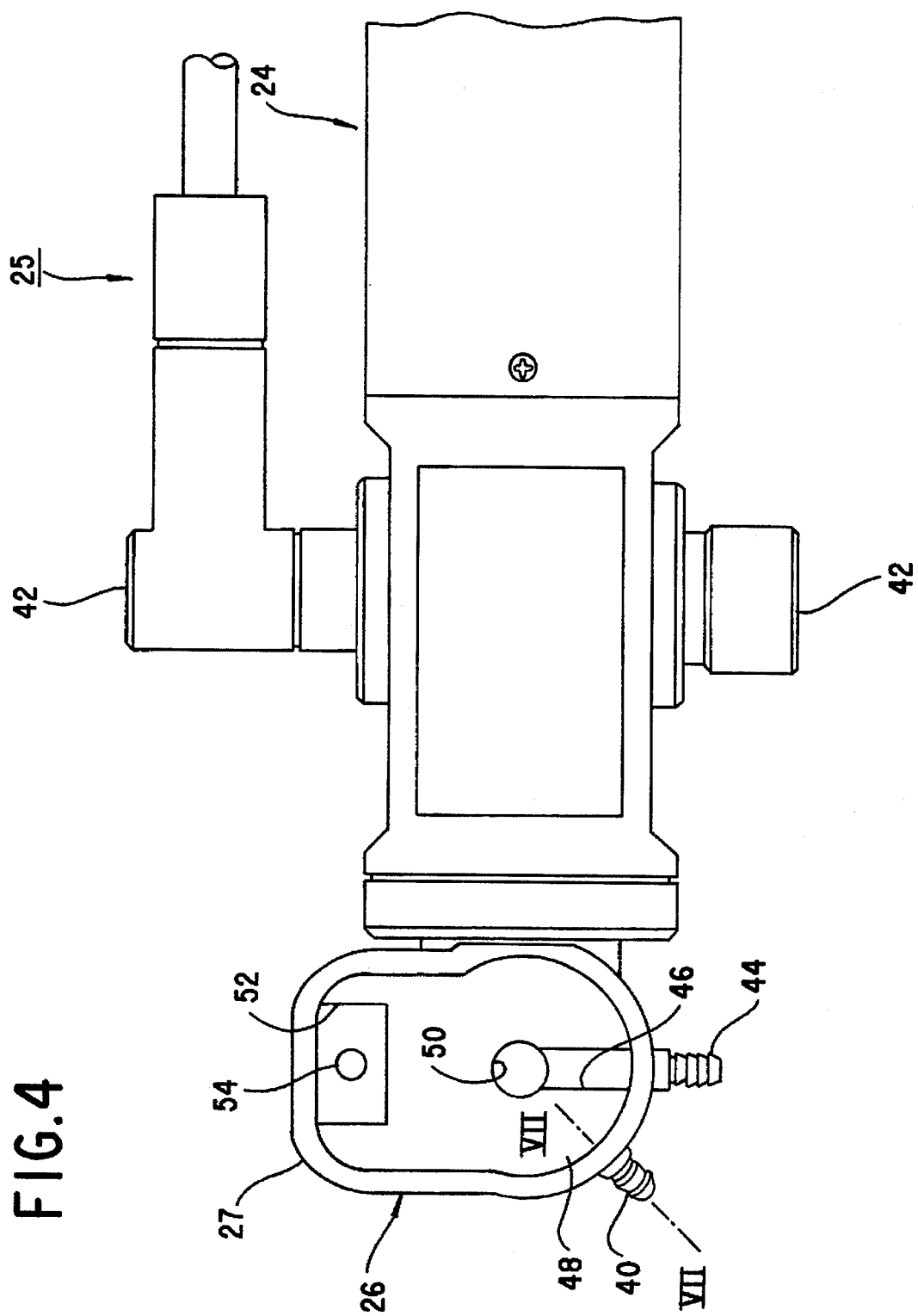
FIG. 4 is a plan view showing the light interference-type film thickness measuring mechanism 24 and a cleaning mechanism 26.
Figure 5:
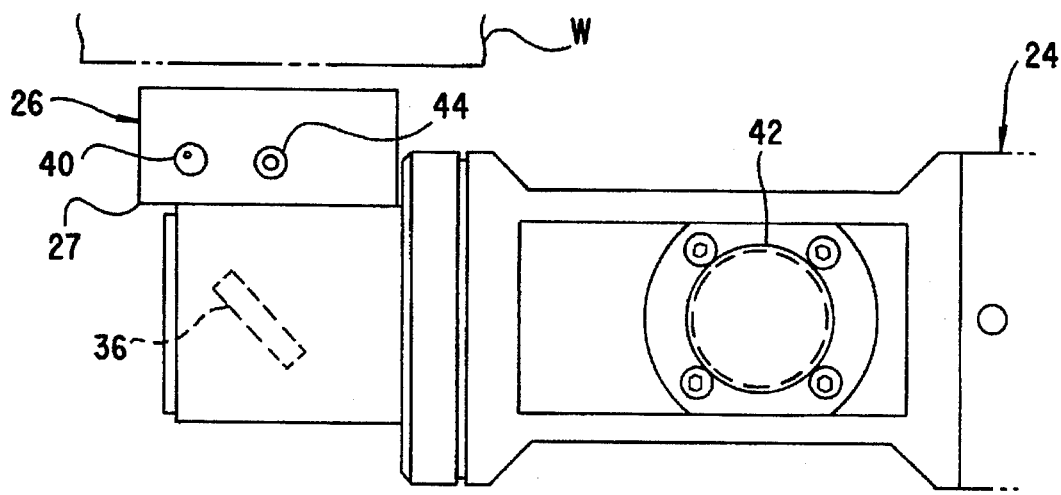
FIG. 5 is a side view showing the light interference-type film thickness measuring mechanism 24 and the cleaning mechanism 26.
Figure 6:
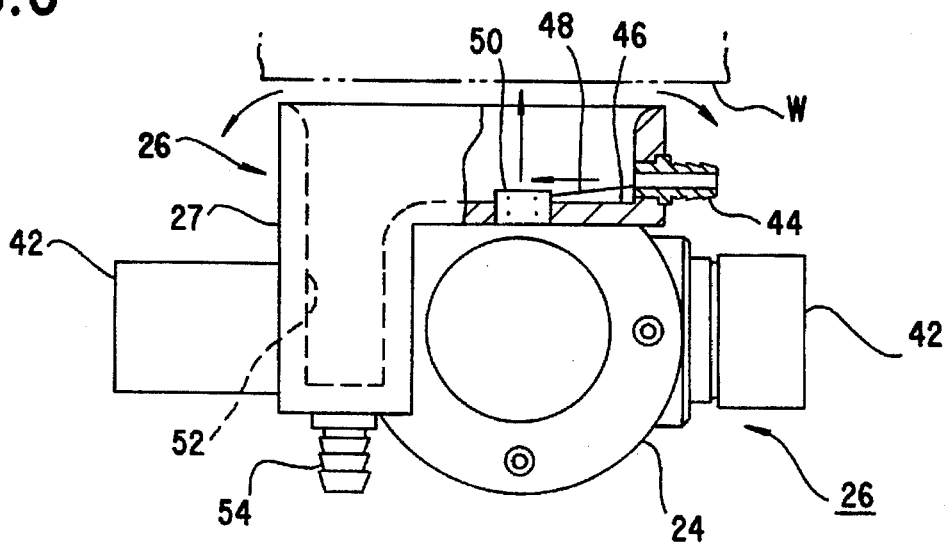
FIG. 6 is a front view showing the light interference-type film thickness measuring mechanism 24 and the cleaning mechanism 26.
Figure 7:
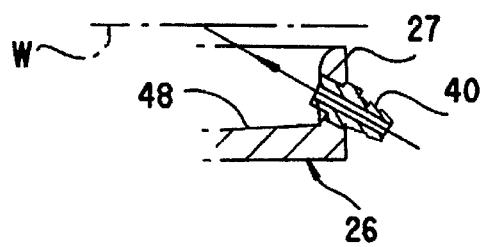
FIG. 7 is a cross sectional view taken on line VII—VII in FIG. 4.

A head drive mechanism 6 is provided above the platen 2 in parallel therewith so as to be moved up and down by means of an ascent/descent mechanism (not shown). In this embodiment, the head drive mechanism 6 includes a total of six (but not limited to six) wafer holding heads 8. These wafer holding heads 8 are equally spaced at 60° around a center axis of the platen 2, as shown in FIG. 2, and rotated by means of the head drive mechanism 6 through a head rotating shaft 10. The bottom surface of the wafer holding head 8 is constructed so that it can hold by suction the top surface of the wafer W, as shown in FIG. 3. The head drive mechanism 6 is moved downward to abut the bottom surfaces of the wafers W (surfaces on which the film is to be formed) against the polishing pad 4 and further, the wafer holding heads 8 are rotated, thereby polishing the bottom surfaces of each of the wafers W.

The wafer W to which the polishing system of this embodiment applied includes, for example, a circuit pattern composed of an aluminum deposited film and an insulating film such as $SiO_2$ formed on the surface thereof. The wafer W is polished for the purpose of polishing and flattening the surface of the insulating film on which irregularities are formed by the circuit pattern. However, it is possible to apply the polishing system of the present invention to a wafer having a film other than an insulating film formed thereon. It is also possible to combine a film thickness measuring apparatus 25 to a system other than the polishing system.

On the base 1, a supporting wall 12 is formed at the side of the platen 2, and the film thickness measuring apparatus 25 is fixed thereto. The film thickness measuring apparatus 25 has a rotation arm 14 which is rotatable in a horizontal position, and a rod 18 of a rotation cylinder 16 (advance/retreat mechanism) is connected to a connecting portion 20 of the rotation arm 14. The base portion of the rotation cylinder 16 is connected to the supporting wall 12 so that the rotation cylinder 16 can be horizontally rotated. When the rod 18 is protruded, the rotation arm 14 enters between the platen 2 and the head drive mechanism 6 (when moved upwards), and when the rod 18 is recessed, the rotation arm 14 withdraws from the platen 2.

A light interference-type film thickness measuring mechanism 24 is provided on the swing arm 14 in a horizontal position through two ascent/descent cylinders 22, and moved up and down in a horizontal position by means of the ascent/descent cylinders 22. A cleaning mechanism 26 is fixed to the top surface of the tip of the light irradiation portion of the light interference type film thickness measuring mechanism 24, and each of the parts are positioned so that the cleaning mechanism 26 is opposed to one of the wafer holding heads 8 when the rotation arm 14 is moved to the platen 2 side.

The light interference-type film thickness measuring mechanism 24 is formed into a long narrow tube, as shown in FIG. 3, and includes therein a CCD camera 28, a Wollaston prism 30, a laser light source 42, an objective lens 34, a mirror 36 and a window 38, in that order from the base portion thereof. When the laser light source 42 emits a laser light in a direction perpendicular to the axis of the light interference-type film thickness measuring mechanism 24, the laser light if reflected by a half mirror (not shown) to be introduced into the objective lens 34 and further, reflected by the mirror 36 and passed through the window 38 and the cleaning mechanism 26 onto the bottom surface of the wafer W.

On the other hand, the reflected light from the wafer W passes through the cleaning mechanism 26 and the window 38 to be reflected by the mirror 36, and passed through the half mirror and the Wollaston prism 30 to reach the CCD camera 28 so that an interference image of the reflected light on the top surface of the film and the reflected light on the bottom surface of the film can be photographed. Output signals of the CCD camera 28 are transmitted to a signal processing machine and a computer (not shown), and the thickness of the insulating film is calculated through a generally known signal processing.

FIGS. 4 to 7 are views showing details of the cleaning mechanism 26. The cleaning mechanism 26 is composed of a cleaning fluid tank (liquid charging tank) 27, the upper face of which is opened and the upper edge thereof is arranged in the vicinity of the bottom surface of the wafer, a light transmission portion 50 formed on the bottom portion 48 of the cleaning fluid tank 27 opposing to the window 38 of the light interference-type film thickness measuring mechanism 24, a cleaning fluid discharge passage 54 for discharging the cleaning fluid from the tank 27, a wafer cleaning nozzle 40 which is provided on the cleaning fluid tank 27 and sprays the cleaning fluid obliquely upward toward the measuring points on the bottom surface of the wafer, a light transmission portion cleaning nozzle 44 spraying the cleaning fluid on the light transmission portion 50, and a cleaning fluid supply means (liquid supply means, not shown) for supplying the cleaning fluid to the wafer cleaning nozzle 40 and the light transmission portion cleaning nozzle 44.

The upper edge of the cleaning fluid tank 27 is formed evenly over the whole circumference so that a part of the cleaning fluid flowing from the wafer cleaning nozzle 40 and the light transmission portion cleaning nozzle 44 overflows almost equally therefrom. The amount of gap between the bottom surface of the wafer W and the upper edge of the cleaning fluid tank 27 is set to, for example, 0.05 to 0.5 mm so that the cleaning fluid tank 27 does not interfere with the wafer W and the bottom surface of the wafer W is immersed over a wide range in the cleaning fluid overflowing from the cleaning fluid tank 27. According to a light interference film thickness measuring method, the distance between the wafer W and the light interference-type film thickness measuring mechanism 24 does not so influence a measurement value. Pure water may be preferably used as the cleaning fluid from the viewpoint of transparency and preventing wafer contamination. A surface active agent and pure water containing a cleaning agent can be used, as needed.

The bottom portion 48 of the cleaning fluid tank 27 is inclined so that the tank 27 becomes deep to the cleaning fluid discharge passage 54 side. A further recessed bottom deep portion 52 is formed at the deepest section of the bottom portion 48, and the cleaning fluid discharge passage 54 is formed at the center of the bottom deep portion 52. By this, a part of the cleaning fluid flowing from the wafer cleaning nozzle 40 and the light transmission portion cleaning nozzle 44 is discharged from the discharge passage 54 through a discharge tube (not shown). The light transmission portion 50 is formed by a transparent material such as a glass.

Figure 9:
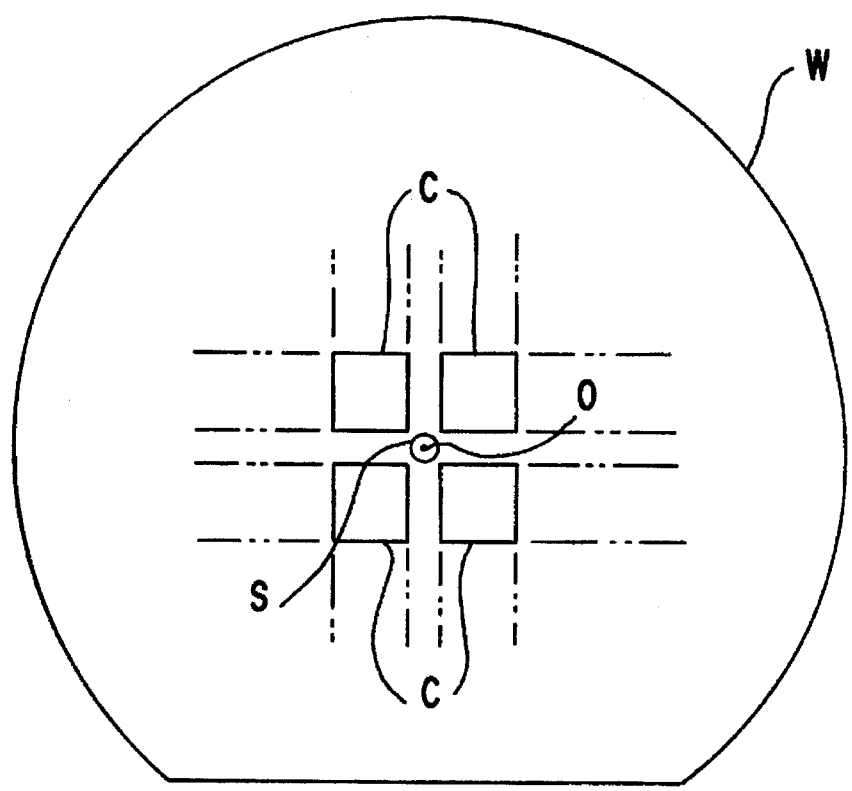
FIG. 9 is a plan view showing a polished surface of a wafer W polished by the polishing system according to the present invention.

In this embodiment, as shown in FIG. 9, each of the parts are positioned so that a center point O of the wafer W on the measurement position coincides with a film thickness measuring range S due to the light interference-type film thickness measuring mechanism 24. Further, it is desirable to give consideration to a design of the wafer W so that no chips C (to become semiconductor devices) exist at the center portion of all of the wafers W. In such a configuration as described above, film thickness measuring range S certainly coincides with the center of the wafer W regardless of orientation of the wafer at the measurement position. Thus, the film thickness can be always measured at a patternless portion where circuit patterns do not exist. Therefore, it becomes unnecessary to correct the results of measurements of the film thickness due to the fact that the measurements are conducted on circuit patterns, and the results of measurements can be easily evaluated.

The usage of the above device will now be specifically described.

In order to polish the wafer W, the wafer W is first set on the bottom surfaces of each of the wafer holding heads 8 with the head drive mechanism 6 moved upward. Thereafter, the head drive mechanism 6 is moved downward to abut the wafer W against the polishing pad 4 with a constant pressure. Then, the wafer holding heads 8 are rotated and the platen 2 is simultaneously rotated while a slurry containing loose abrasive and alkaline solution and the like is supplied onto the platen 2 so as to polish six sheets of wafer W simultaneously.

In order to measure the thickness of the wafer W, the head drive mechanism 6 is moved upward, and the light interference-type film thickness measuring mechanism 24 is moved forward to oppose the wafer W located at the measuring position. Further, the cleaning fluid supply means is operated to inject the cleaning fluid from the wafer cleaning nozzle 40 toward the film thickness measuring range S on the center of the bottom surface of the wafer W so that the slurry and the like is flushed away and drying of the wafer is prevented. At the same time, the cleaning fluid is injected from the light transmission portion cleaning nozzle 44 toward the light transmission portion 50 along a groove 46 in order to keep the top surface of the light transmission portion 50 clean. When the cleaning fluid overflows from the upper edge of the cleaning fluid tank 27 for a time, the light interference-type film thickness measuring mechanism 24 is operated to measure to measure the thickness of the film on wafer W as in the manner described above.

According to the wafer polishing device constructed as described above, the thickness of the film on wafer W can be measured with a normally high accuracy of the light interference film thickness measuring method while removing the slurry and chipping adhered to the wafer W while being polished with the cleaning fluid and also preventing sticking of any contamination due to drying of the wafer W under measurement. By filling a space between the light transmission portion and the wafer forming surface with the cleaning fluid to remove vapor, disturbance to light interference due to the vapor can be prevented and the thickness of the wafer W can be correctly measured. Further, since there is no deterioration of the wafer W due to drying, no treatment is required for the wafer W after the measurement of its thickness, and polishing of the wafer W can be immediately started again. Therefore, the wafer polishing system described above offers the following excellent effects: the thickness of the film can be measured with high accuracy in-process during a polishing step; the amount of polishing can be corrected based on the result of the measurement; and polishing with high accuracy can be easily performed.

In order to ensure the above effects, the following components may be desirably incorporated into the above system. All of these components are constructed as a part of a control program in a computer which controls actions of parts of the system:

a) initial condition storage means for storing a previously input predicted value of a polishing rate and a target amount of polishing;

b) initial thickness measurement means for measuring the thickness of the film on the pre-polishing wafer W with the film thickness measuring apparatus 25;

c) calculation means for calculating the time (primary polishing time) required for obtaining the above target amount of polishing using the predicted value of polishing rate stored in the above initial condition storage means and the thickness of the film on the pre-polishing wafer W as data;

d) primary polishing means for polishing the film formed on the bottom surface of the wafer by operating the platen drive mechanism and the head drive mechanism 6 for a predetermined ratio (such as 50%) of the above primary polishing time;

e) measurement means for measuring the thickness of the film formed on the bottom surface of the wafer (thickness value measured during polishing) by means of the film thickness measuring apparatus 25 after the completion of the primary polishing;

f) calculation means for calculating an actual polishing rate from the above thickness value measured during polishing;

g) calculation means for calculating the secondary polishing time required for obtaining the above target amount of polishing from the thickness value measured during polishing, the actual polishing rate and the target amount of polishing;

h) secondary polishing means for polishing the film on the bottom surface of the wafer by operating the platen drive mechanism and the head drive mechanism 6 for the period of the above secondary polishing time;

i) judgement means for measuring the thickness of the film on the wafer W by the film thickness measuring device 25, judging whether the measured thickness is within the allowable range of the target amount of polishing, and operating again the measurement means for measuring the thickness of the film during polishing, calculation means for calculating the actual polishing rate, the calculation means for calculating secondary polishing means if the amount of the polishing is not enough.

Figure 8:
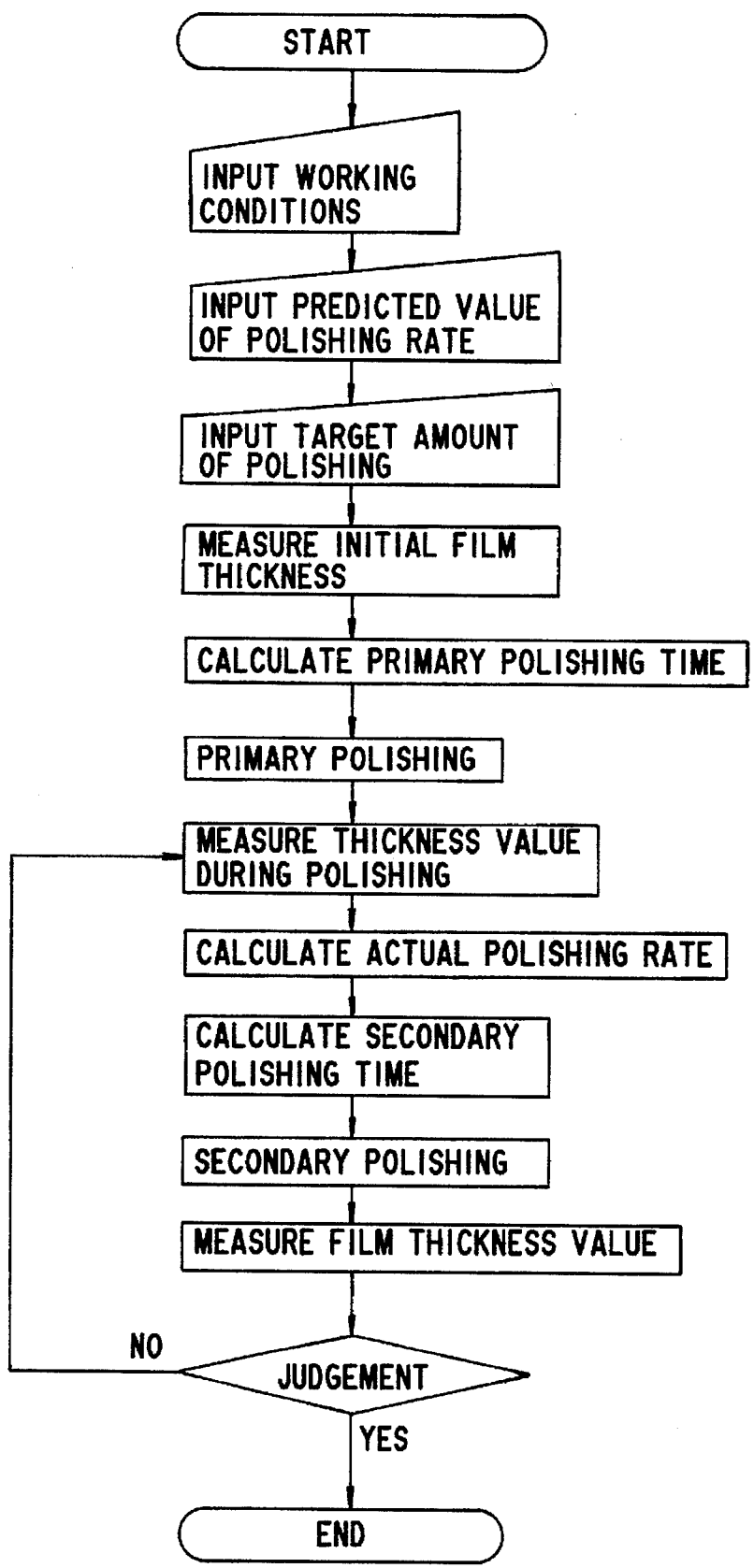
FIG. 8 is a flowchart showing operation of the wafer polishing system.

A method of polishing the wafer when the above constituents a) to i) are provided will be described on the basis of the flowchart shown in FIG. 8.

In this case, before starting polishing, processing conditions by this polishing device, the predicted value of the polishing rate and the target amount of polishing to be finally attained (may be a final thickness) are first input from an input device such as a keyboard connected to a computer to be stored in the initial conditions storage means.

Next, the film thickness measuring apparatus 25 is operated to measure the initial thickness of the film on the pre-polishing wafer W by the initial thickness measurement means. Thereafter, the primary polishing time required for obtaining the target amount of polishing is calculated by the calculation means for calculating the primary polishing time using the predicted value of polishing rate and the target amount of polishing stored in the initial condition storage means, and the measured thickness of the film on the pre-polishing wafer as data.

Then, the platen drive mechanism and the head drive mechanism 6 are operated for the primary polishing time multiplied by the predetermined ratio so as to polish the film formed on the bottom surface of the wafer part by way of the primary polishing means. After completion of the primary polishing, the film thickness measuring apparatus 25 is operated by the measurement means for measuring the thickness value of the film during polishing.

Then, the actual polishing rate is calculated from the thickness value of the film during polishing by the calculation means for calculating the actual polishing rate, and the secondary polishing time required for obtaining the target amount of polishing is calculated by the calculation means for calculating the secondary polishing time using the thickness value of the film during polishing, the actual polishing rate and the target amount of polishing as data.

The platen drive mechanism and the head drive mechanism 6 are then operated for the calculated secondary polishing time to polish the film formed on the bottom surface of the wafer by the secondary polishing means. Thereafter, the film thickness measuring apparatus 25 is operated to measure the thickness value of the wafer W, and the thickness value is judged by the judgement means whether or not it is within the allowable range of the target amount of polishing. If the amount of polishing is not enough, the measurement of the thickness value of the film during polishing, calculation of the actual polishing rate, calculation of the secondary polishing time and the secondary polishing are performed again and thereafter, judgement by the judgement means is repeated. On the other hand, if the measured value of the film on the wafer W is within the allowable range, wafer polishing is ended.

According to the wafer polishing system and a polishing method as described above, the in-process measurement of the film thickness which is a feature of the present invention can be effectively utilized, thereby remarkably increasing reliability as compared with a case of merely confirming the thickness of the film at any given time.

It can be understood that the present invention is not limited to the embodiment as described above, and that suitable changes and modifications may be made, as needed. For example, the film thickness measurement may be performed with the surface of the film formed on the wafer pointed to the horizontal direction or upward direction, as needed although the film thickness measurement is performed with the surface of the film formed on the wafer pointed downward in the above embodiment.

As described above, in the wafer thickness measuring apparatus and the wafer thickness measuring method, the thickness of the film formed on the wafer is measured by arranging the liquid charging tank so that the peripheral edge of the liquid charging tank is in the close vicinity to the surface of the film formed on the wafer to be measured for the thickness thereof, supplying the liquid to the inside of the liquid charging tank so as to fill a space between the light transmission portion and the surface of the film formed on the wafer with the liquid, irradiating a light emitted from the light transmission portion of the light interference-type film thickness measuring mechanism on the surface of the film formed on the wafer through the light transmission portion and the liquid, receiving its reflected light at the light transmission portion, and detecting interference of the light.

By this, the thickness of the film can be measured with high accuracy while filling the space between the light transmission portion and the surface of the film formed on the wafer with the liquid to remove vapor and prevent disturbances due to the vapor to light interference. Furthermore, since there is no fear of deterioration of the wafer due to drying, working of the wafer after the film thickness measurement can be immediately started again.

In addition, in the film thickness measuring apparatus and the film thickness measuring method, the thickness of the film can be measured by supplying the cleaning fluid to the cleaning fluid tank arranged opposite to the surface of the film formed on the wafer, flowing out the cleaning fluid from a gap between the peripheral edge of the opening of the cleaning fluid tank and the surface of the film formed on the wafer to remove vapor phase from the cleaning fluid tank, and irradiating the light on the surface of the film formed on the wafer through the light transmission portion of the cleaning fluid tank and the cleaning fluid in the tank while spraying the cleaning fluid on the film thickness measuring points of the wafer. Therefore, even if a contaminated wafer during working, such as polishing, is applied to the film thickness measurement, the thickness can be measured with a normally high accuracy of the light interference film thickness measuring method while removing the contamination on the surface of the film formed on the wafer with the cleaning fluid and preventing sticking of contamination of the wafer due to drying. In addition, by filling a space between the light transmission portion and the surface of the film formed on the wafer with the cleaning fluid to remove vapor, disturbance to light interference due to the vapor can be prevented and the thickness can be correctly measured. Further, since there is no deterioration of the wafer due to drying, working of the wafer after the film thickness measurement can be immediately started again. Therefore, the thickness can be measured with high accuracy during a working step, and the results thereof can be easily reflected to the working.

Also, in the wafer polishing system, the thickness of the film formed on the wafer can be measured with high accuracy during polishing of the film due to the same operation as described above and the amount of polishing can be corrected based on the measurement results. Thus, high-accuracy polishing can be easily performed.

We claim:

1. A film thickness measuring apparatus for measuring a thickness of a film formed on a surface of a wafer using light interference, comprising:

a light interference-type film thickness measuring mechanism measuring a film thickness by irradiating a light emitted from a light irradiation portion on to a surface of the film formed on the wafer through a light transmission portion, and receiving light reflected from the surface of said film at said light irradiation portion to detect interference thereof;

a liquid charging tank having an opening at one end thereof and a peripheral edge of said opening being arranged next to the surface of the film formed on the wafer, wherein said light transmission portion of said light interference-type film thickness measuring mechanism is arranged opposite to film thickness measuring points of the wafer and penetrates through a bottom portion of the other end of the liquid charging tank; and a liquid supply means for supplying liquid capable of passing the light to the inside of said liquid charging tank.

2. A film thickness measuring apparatus for measuring a thickness of a film formed on a first surface of a wafer a second surface thereof being held by suction, comprising:

a light interference-type film thickness measuring mechanism measuring a film thickness by irradiating a light emitted from a light irradiation portion on the surface of the film formed on the wafer, and receiving light reflected from the surface of said film at said light irradiation portion to detect interference thereof; and a cleaning mechanism mounted between said light irradiation portion and said film formed on said first surface of said wafer;

wherein said cleaning mechanism includes a cleaning fluid tank having an opening at a surface opposite to a surface of said film formed on said wafer, having a peripheral edge thereof being arranged next to said film;

a wafer cleaning nozzle provided on said cleaning fluid tank spraying cleaning fluid on measuring points on the surface of the film formed on the wafer; and a cleaning fluid supply means for supplying the cleaning fluid to said wafer cleaning nozzle.

3. A film thickness measuring apparatus according to claim 2, wherein said light interference-type film thickness measuring mechanism is integrated with said cleaning mechanism, and wherein an advance/retreat mechanism for moving said light interference-type film thickness measuring mechanism and said cleaning mechanism between a position where said light interference-type film thickness measuring mechanism integrated with said cleaning mechanism is evacuated from the wafer to be measured for thickness and a position where said peripheral edge of said opening of said cleaning fluid tank is arranged next to the surface of the film formed on the wafer.

4. A film thickness measuring apparatus according to claim 2 or 3, wherein said cleaning fluid tank comprises a light transmission portion cleaning nozzle for spraying the cleaning fluid on said light irradiation portion.

5. A film thickness measuring method, comprising the steps of:

positioning a liquid charging tank having an opening at a first end and a light transmission portion at a second end so that a peripheral edge of said opening is adjacent to a surface of a film formed on the wafer to be measured;

supplying liquid capable of passing light to the inside of said liquid charging tank so as to fill a space between said light transmission portion and the surface of the film formed on the wafer with the liquid;

irradiating a light emitted from the light transmission portion onto the surface of the film formed on the wafer through said liquid;

receiving reflected light from said film at said light transmission portion; and detecting interference of the light so as to measure the thickness of the wafer.

6. A film thickness measuring method for measuring the thickness of a film formed on a first surface of a wafer, a second surface of the wafer being held by suction, comprising the steps of:

arranging the cleaning fluid tank having an opening formed at one end thereof so that said opening is opposite to the surface of the film formed on the wafer;

supplying the cleaning fluid to the inside of said cleaning fluid tank to fill the tank with the cleaning fluid;

overflowing the cleaning fluid from a gap between said opening and the surface of the film formed on the wafer;

spraying the cleaning fluid from a wafer cleaning nozzle provided on said cleaning fluid tank on to the measuring points on the surface of the film formed on the wafer to clean said measuring points;

irradiating a light from a light transmission portion formed at the bottom portion of said cleaning fluid tank through only cleaning fluid on to the surface of the film; and detecting interference of light reflected from top surface of the film formed on the wafer and light reflected from a bottom surface of the film.

7. A film thickness measuring method according to claim 6, wherein pure water is used as said cleaning fluid.

8. A film thickness measuring method according to claim 6 or 7, wherein said measurement is performed at a center portion of the wafer, wherein said wafer has circuit patterns formed under said film and has a patternless portion where no circuit patterns exist formed under said film at the center portion of the wafer.

9. A wafer polishing system, comprising:

a platen having a polishing pad affixed to the surface thereof rotated by a platen drive mechanism;

wafer holding heads holding by suction a first surface of the wafer so as to abut a second surface of the wafer against said polishing pad;

a head drive mechanism moving said wafer holding heads in a direction parallel to said platen; and a film thickness measuring apparatus for measuring the thickness of a film formed on the polished second surface of the wafer, wherein said film thickness measuring apparatus includes a light interference-type film thickness measuring mechanism measuring a film thickness by irradiating a light emitted from a light irradiation portion on to the polished second surface of the wafer, and receiving light reflected at said light irradiation portion to detect interference;

a cleaning mechanism mounted between said light irradiation portion and said polished second surface of the wafer; and an advance/retreat mechanism for moving said light interference-type film thickness measuring mechanism and said cleaning mechanism between a position removed from the wafer and a position next to the polished second surface of the wafer; and wherein said cleaning mechanism has a cleaning fluid tank having an opening opposite to the polished second surface of the wafer and peripheral edges thereof being arranged in the vicinity of the polished second surface of the wafer;

a wafer cleaning nozzle provided on said cleaning fluid tank spring cleaning fluid on measuring points on the polished second surface of the water; and a supply means for supplying the cleaning fluid of said wafer cleaning nozzle.

10. A wafer polishing system according to claim 9, further comprising:

control means for storing a predetermined predicted value of a polishing rate and a target amount of polishing;

for measuring an initial thickness of the pre-polished wafer with said film thickness measuring apparatus;

for calculating a primary polishing time required for obtaining said target amount of polishing using the stored predicted value of the polishing rate, the stored target amount of polishing and the measured initial thickness of the pre-polished wafer;

for polishing the film formed on the surface of the wafer polished by operating said platen drive mechanism and said head drive mechanism as a function of the calculated primary polishing time;

for measuring a post-polished thickness of the film formed on the surface of the polished wafer by said film thickness measuring apparatus after the completion of the primary polishing;

for calculating an actual polishing rate from the measured post-polished thickness;

for calculating a secondary polishing time required for obtaining said target amount of polishing from said measured post-polished thickness, said actual polishing rate and said target amount of polishing;

for polishing the film formed on the surface of the wafer polished by operating said platen drive mechanism and said head drive mechanism only for said secondary polishing time; and for measuring the thickness value of the film on the wafer by said film thickness measuring apparatus, judging whether the thickness value is within the allowable range of said target amount of polishing and again measuring a post-polished thickness value, calculating the actual polishing rate, calculating the secondary polishing time and polishing the film, if the amount of the polishing is not enough.

* * * * *